Nov. 7, 1967   W. BERGHOLDT ETAL   3,350,913
METHOD OF AND APPARATUS FOR FLATTENING SHEET BERYLLIUM
Filed Oct. 14, 1965
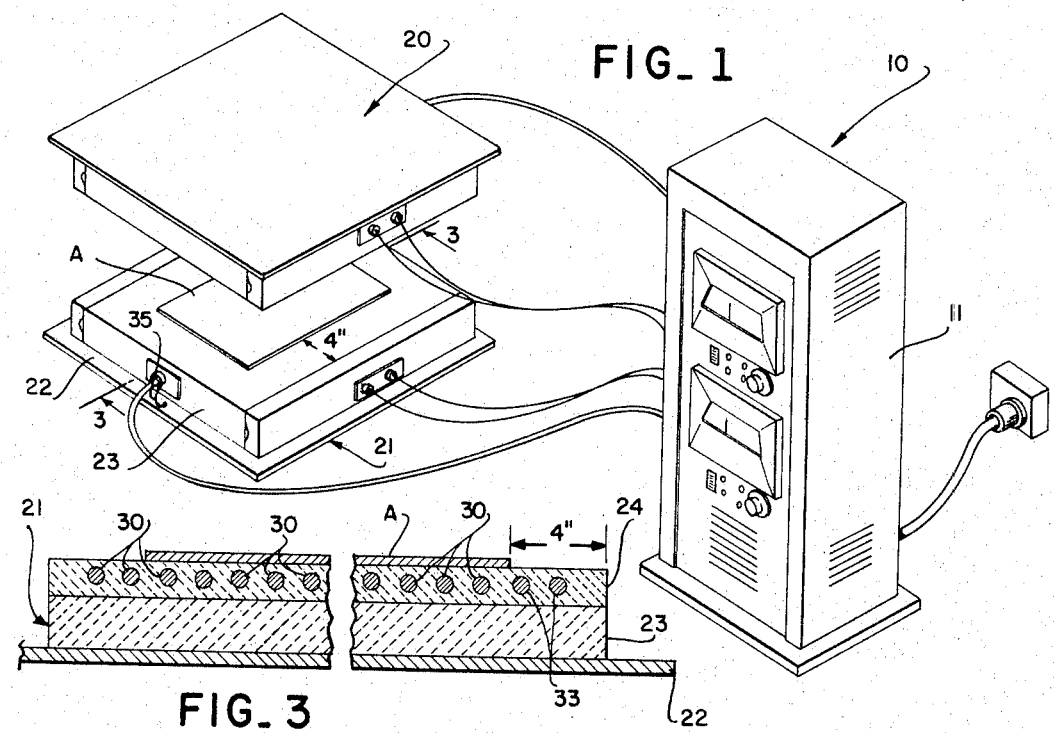
FIG. 1
FIG. 3
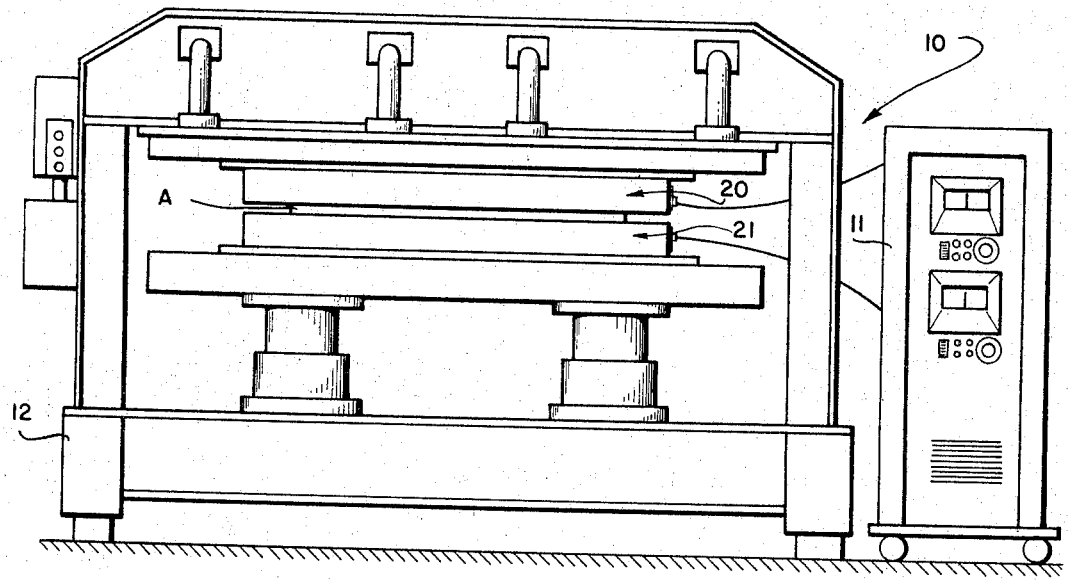
FIG. 2
INVENTORS
WILLIAM BERGHOLDT
EDWARD W. BAUER
BY *George C. Sullivan*
Agent

United States Patent Office 3,350,913
Patented Nov. 7, 1967

3,350,913
METHOD OF AND APPARATUS FOR
FLATTENING SHEET BERYLLIUM
William Bergholdt and Edward W. Bauer, Los Altos, Calif., assignors to Lockheed Aircraft Corporation, Burbank, Calif.
Filed Oct. 14, 1965, Ser. No. 495,870
3 Claims. (Cl. 72—342)

ABSTRACT OF THE DISCLOSURE

A method of flattening sheets metal and metal alloys which utilizes large dies which uniformly heat the sheet member and allow it to cool uniformly after waviness or irregularities in the sheet to be flattened have been removed by heat and pressure.

---

The present invention relates in general to the processing of metals, and more particularly to a method of and apparatus for flattening of sheet beryllium.

A need has arisen for high strength low weight structural members, with the ability of maintaining these properties at elevated temperatures.

Sheet beryllium lends itself to meeting these requirements. However, many difficulties have arisen in efforts to fabricate and assemble such structural members due to the waviness of sheet material currently available on the market. When it is necessary to join adjacent sheets to each other or to other elements of the structure by brazing, welding, or mechanical fastening, accurate fits between adjacent elements are essential. Proper fastening or joining cannot be accomplished without accurate fits and initial intimate contact between joined or fastened elements. If gaps or improper fits occur, joined or mechanically fastened joints will not develop adequate strength. If the elements are forced together either prior to, or as a consequence of the joining or fastening operation, internal stresses are produced in the material which lead to loss of strength and/or cracking of the joined elements. It is therefore essential that sheet material be fabricated to accurate dimensions. In other applications where joining may not be a problem, flatness is a necessity for other reasons. The characteristic of a very high specific heat, in comparison to other metals, makes beryllium highly desirable as a material to be employed as a heat sink or used in applications where heat energy is to be transferred from one element to another. In such applications, surface flatness and intimate contact over large areas are essential to obtain optimum heat transfer.

Heretofore, it has been the practice of beryllium sheet fabricators to produce sheet stock with a waviness of ±4%. At times the fabricators of rolled beryllium sheet stock have been able to supply beryllium sheet stock with a flatness of ±2% for a significant price premium. Even beryllium stock with a waviness of ±2% is not considered "flat" enough to overcome the problem of weakness and cracking during brazing or other joining operations, and is totally unusable as a faying surface in heat transfer applications.

Accordingly, the principal object of the present invention is to provide an improved method for the flattening of sheet beryllium.

Another object of the present invention is to provide a method of flattening sheet beryllium, whereby the waviness thereof is not greater than about ±.01%.

Another object of the present invention is to provide a method of flattening sheet beryllium in which distortion therein is minimized.

Another object of the present invention is to modify rolled sheet beryllium stock so as to be useful in applications not heretofore possible or practical.

Another object of the present invention is to modify rolled sheet beryllium stock so as to make possible the fabrication and assembly of structural members with strength, weight, and thermal properties heretofore unattainable.

Other and further objects and advantages will be apparent to one skilled in the art from the following description taken in conjunction with the accompanying drawings, in which:

FIGURE 1 is a diagrammatic view of apparatus embodying the present invention for the flattening of sheet beryllium illustrated with the flattening dies thereof spaced apart and removed from a hydraulic press.

FIGURE 2 is a diagrammatic front elevational view of the apparatus shown in FIGURE 1 illustrated with the flattening dies thereof engaging the sheet of beryllium to be flattened and seated within the hydraulic press.

FIGURE 3 is a vertical sectional view taken along line 3—3 of FIGURE 1 to further illustrate the flattening die employed in the present invention.

In the method of the present invention for flattening rolled beryllium sheet, a sheet of beryllium is disposed between flat confronting faces of juxtaposed dies. The faces of the dies engaging the opposing surfaces of the beryllium sheet should be as flat as the waviness requirement for the flattened sheet of beryllium.

The confronting die faces with the sheet of beryllium therebetween are heated uniformly to a temperature in the vicinity of 1375° F. In the preferred embodiment of the present invention, the working temperature is maintained uniform at 1375° ±25° F. After the dies with the beryllium sheet therebetween are heated to the vicinity of 1375° F., a die pressure of approximately 2 pounds per square inch is applied uniformly to the opposing surfaces of the sheet of beryllium. The working temperature of 1375° F. and the applied pressure of 2 pounds per square inch are maintained in the exemplary embodiment for a time duration of approximately 20 minutes. The beryllium sheet is in a ductile condition at 1375° F. and will readily conform to the flat contour of the die faces. It is desired that all working faces of the dies and the opposing surfaces of the sheet of beryllium be maintained at a uniform temperature in the range between 1350° F. and 1400° F. during the aforementioned 20-minute period.

After the sheet of beryllium is heated uniformly throughout the opposing surfaces thereof in the vicinity of 1375° F. for a period of 20 minutes and under a uniform die pressure of 2 or more pounds per square inch, the die faces with the sheet of beryllium therebetween are permitted to cool to 500° F. or less or to room temperature if time permits while the sheet of beryllium remains between the confronting die faces and while the constant die pressure of 2 or more pounds per square inch is maintained. The cooling of the confronting faces of the dies with the sheet of beryllium therebetween takes place over a relatively short period of time. However, the cooling of the sheet of beryllium should be controlled so that the temperature differentials from side-to-side and edge-to-edge do not exceed 50° F. until room temperature is approached.

While in the preferred embodiment of the present invention the sheet of beryllium is not removed from the dies until room temperature is reached during the cooling period, it is possible to remove the sheet of beryllium from the dies after the sheet of beryllium has cooled to a temperature of 500° F. or less.

Illustrated in FIGURES 1 and 2 is the apparatus 10 of the present invention for flattening a sheet of beryllium A. The flattening apparatus 10 comprises a suitable power supply unit. Adjacent to the power supply unit 11 is a conventional hydraulic press 12. Seated within the hydraulic press are juxtaposed dies 20 and 21. Disposed between the confronting surfaces of the dies 20 and 21 is the sheet of beryllium A to be flattened. The hydraulic press 12 is capable of producing the constant die pressure of 2 or more pounds per square inch. The power supply unit 11 is capable of the heating of the dies 20 and 21 with the sheet of beryllium therebetween to 1375° F.

According to the present invention, the confronting die faces of the dies 21 and 22, should be as flat as the waviness requirement for the sheet of beryllium A and should be capable of heating to a uniform die face temperature in the vicinity of 1375° F. The flat dies 20 and 21 are similar in construction and operation. Hence, only the flat die 21 will be described in detail.

The flat die 21 comprises a flat base 22. Seated on the base 22 in fixed relation thereto is a suitable ceramic platen block 23. In the preferred embodiment, the ceramic platen block 23 is formed from an open cell type pure fused silicon foam. The ceramic block may be obtained from Glasrock Products Inc. of Atlanta, Ga., as Glasrock Foam Block #25. To form the flattening surface for the die 20, there is fixed to the ceramic block 23 a flat ceramic layer 24, which may be made from Glasrock Cement produced by the Glasrock Products Inc. of Atlanta, Ga., or equivalent. The surface of the ceramic layer 24 upon which the sheet of beryllium A rests must be as flat as the waviness requirement to be obtained from the flattened sheet of beryllium. The exposed, flattening surface of the ceramic layer 24 must be sufficiently large to maintain a margin on all sides taken from the edge of the sheet of beryllium A to the corresponding adjacent parallel edge of the ceramic layer 24 (FIGURE 1) to prevent edge cooling. In the exemplary embodiment, this distance was found to be approximately 4 inches.

Embedded within the ceramic layer 24 are a plurality of heater elements 30, which may be made from Nichrome V wire or equivalent. As shown in FIGURES 1 and 2, the power supply unit 11 is connected to the dies 20 and 21 for supplying electrical power to the heating elements thereof. When the power supply unit 11 supplies electrical current to the heating element 30, the flattening surface of the die 21 heats to the temperature in the vicinity of 1375° F. Disposed within the die 21 is a thermocouple probe 35 that is connected to the power supply unit 11, which controls the operation of the power supply unit 11 or produces a warning signal if the heater current varies by more than a prescribed amount. Toward this end, the power supply unit 11 contains a relay circuit that is operatively controlled by the thermocouple probe 35.

The term "waivness" as employed herein means any departure from true flatness and is defined as the measured deviation from a straight line between adjacent high points on the sheet surface, with the measured deviation expressed as a percentage of the measured distance between adjacent high points.

While reference herein is made to sheets of beryllium, it is apparent that the invention disclosed herein is equally applicable to sheets of beryllium alloys.

It is to be understood that modifications and variations of the embodiment of the invention disclosed herein may be resorted to without departing from the spirit of the invention and the scope of the appended claims.

Having thus described our invention, what we claim as new and desire to protect by Letters Patent is:

1. A method of flattening beryllium comprising the step of,
positioning a sheet of beryllium between confronting flat faces of dies, heating said dies to maintain a uniform temperature of the confronting faces thereof in the range between 1350° F. and 1400° F., applying a die pressure to the opposing surfaces of said sheet of beryllium, and permitting said dies and die faces to cool while remaining in contact with said sheet for cooling said sheet of beryllium to room temperature, said cooling of said sheet of beryllium being arranged so that the temperature thereof remains substantially uniform from side-to-side and edge-to-edge.

2. A method of flattening beryllium comprising the steps of,
positioning a sheet of beryllium between confronting flat faces of dies so that marginal spaces are provided between the edges of the sheet of beryllium and the corresponding peripheral edges of said dies to reduce edge cooling, heating said dies to maintain a uniform temperature over the confronting faces thereof between approximately 1350° F. and 1400° F. for a time duration of approximately 20 minutes, applying a uniform die pressure of approximately 2 pounds per square inch along the opposing surfaces of said sheet of beryllium during said time duration of 20 minutes, permitting said dies to cool while in contact with said surfaces of beryllium thus for cooling said sheet of beryllium to at least 500° F., said cooling of said sheet of beryllium being arranged so that the temperature thereof remains uniform within a range of approximately 50° F. from side-to-side and edge-to-edge while cooling, and removing said sheet of beryllium from said dies.

3. A method for flattening beryllium sheet comprising the steps of positioning a sheet of beryllium between confronting flat die faces in such a manner that marginal spaces are provided between the edges of the sheet of beryllium and the corresponding peripheral edges of said dies so as to promote substantially uniform edge cooling, said die faces being of a sufficient thickness to provide for uniform cooling at the surface area of each surface of beryllium sheet, said dies having heating elements embedded therein, said elements being disposed away from the face surface of said dies so as to provide for substantially uniform heat across the face of said die, heating said dies to maintain a uniform temperature over the confronting faces thereof between approximately 1350° F. and approximately 1400° F., applying a uniform die pressure against the opposing surfaces of said sheet of beryllium, permitting said dies to cool, while remaining in contact with said surfaces of beryllium while cooling said sheet of beryllium to at least 500° F., said cooling of said sheet of beryllium being arranged so that the temperature thereof remains uniform within a range of approximately 50° F. from side-to-side and edge-to-edge while cooling.

References Cited

UNITED STATES PATENTS

| | | | |
|---|---|---|---|
| 663,156 | 12/1900 | Budke | 72—368 |
| 3,015,292 | 1/1962 | Bridwell | 72—342 |
| 3,094,160 | 6/1963 | Walton et al. | 72—342 |

CHARLES W. LANHAM, *Primary Examiner.*

L. A. LARSEN, *Assistant Examiner.*